United States Patent
Shohara et al.

(10) Patent No.: US 9,756,243 B2
(45) Date of Patent: Sep. 5, 2017

(54) IMAGING CONTROLLER AND IMAGING CONTROL METHOD AND PROGRAM

(71) Applicants: Makoto Shohara, Tokyo (JP); Yoshiaki Irino, Kanagawa (JP); Tomonori Tanaka, Kanagawa (JP); Nozomi Imae, Kanagawa (JP); Hirokazu Takenaka, Kanagawa (JP); Hideaki Yamamoto, Kanagawa (JP); Kensuke Masuda, Kanagawa (JP); Yoichi Ito, Tokyo (JP); Satoshi Sawaguchi, Kanagawa (JP); Daisuke Bessho, Kanagawa (JP); Hiroyuki Satoh, Kanagawa (JP)

(72) Inventors: Makoto Shohara, Tokyo (JP); Yoshiaki Irino, Kanagawa (JP); Tomonori Tanaka, Kanagawa (JP); Nozomi Imae, Kanagawa (JP); Hirokazu Takenaka, Kanagawa (JP); Hideaki Yamamoto, Kanagawa (JP); Kensuke Masuda, Kanagawa (JP); Yoichi Ito, Tokyo (JP); Satoshi Sawaguchi, Kanagawa (JP); Daisuke Bessho, Kanagawa (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 230 days.

(21) Appl. No.: 14/419,556

(22) PCT Filed: Sep. 3, 2013

(86) PCT No.: PCT/JP2013/074170
§ 371 (c)(1),
(2) Date: Feb. 4, 2015

(87) PCT Pub. No.: WO2014/042104
PCT Pub. Date: Mar. 20, 2014

(65) Prior Publication Data
US 2015/0222816 A1    Aug. 6, 2015

(30) Foreign Application Priority Data

Sep. 11, 2012 (JP) .................................. 2012-199622

(51) Int. Cl.
*H04N 5/232* (2006.01)
*G03B 7/08* (2014.01)
(Continued)

(52) U.S. Cl.
CPC ........... *H04N 5/23238* (2013.01); *G03B 7/08* (2013.01); *H04N 5/2173* (2013.01);
(Continued)

(58) Field of Classification Search
CPC ............. H04N 5/23238; H04N 5/2258; H04N 5/2173; H04N 5/235; H04N 5/2351; G03B 7/08; G03B 37/04
See application file for complete search history.

(56) References Cited

U.S. PATENT DOCUMENTS

| 5,903,303 A | 5/1999 | Fukushima et al. |
| 6,201,574 B1 * | 3/2001 | Martin .............. G06F 17/30017 348/143 |

(Continued)

FOREIGN PATENT DOCUMENTS

| CN | 1512256 A | 7/2004 |
| CN | 101534453 A | 9/2009 |

(Continued)

OTHER PUBLICATIONS

Extended European Search Report issued Jul. 30, 2015 in Patent Application No. 13837222.2.
(Continued)

*Primary Examiner* — Sath V Perungavoor
*Assistant Examiner* — Howard D Brown, Jr.
(74) *Attorney, Agent, or Firm* — Oblon, McClelland, Maier & Neustadt, L.L.P.

(57) ABSTRACT

An imaging controller includes an index calculator to calculate an index value for each of divided areas of images captured by a plurality of imaging units, the index value for
(Continued)

evaluating a photographic state of each of the divided areas, an evaluation value calculator to evaluate the images and an overlapping area between the images on the basis of the index value of each divided area calculated by the index calculator and calculate an overall evaluation value, and a condition determiner to determine an imaging condition for each of the imaging units on the basis of the overall evaluation value calculated by the evaluation value calculator.

9 Claims, 7 Drawing Sheets

(51) Int. Cl.
    *H04N 5/217*     (2011.01)
    *H04N 5/235*     (2006.01)
    *H04N 5/225*     (2006.01)
    *G03B 37/04*     (2006.01)

(52) U.S. Cl.
    CPC .......... *H04N 5/2258* (2013.01); *H04N 5/235* (2013.01); *H04N 5/2351* (2013.01); *G03B 37/04* (2013.01)

(56) References Cited

U.S. PATENT DOCUMENTS

| | | |
|---|---|---|
| 2004/0184656 A1 | 9/2004 | Anei |
| 2004/0247173 A1* | 12/2004 | Nielsen ................ G06T 3/0062 382/154 |
| 2007/0223908 A1 | 9/2007 | Sakamoto |
| 2009/0207246 A1* | 8/2009 | Inami .................. G01S 3/7864 348/135 |
| 2009/0309957 A1* | 12/2009 | Ge ....................... H04N 3/1587 348/36 |
| 2011/0181689 A1* | 7/2011 | Kweon ................. G03B 37/00 348/37 |
| 2011/0216154 A1* | 9/2011 | Nam ...................... H04N 7/14 348/14.07 |
| 2011/0293259 A1 | 12/2011 | Doepke et al. |
| 2012/0147183 A1* | 6/2012 | Nishimura ............ G02B 13/06 348/143 |
| 2012/0154643 A1* | 6/2012 | Okuyama ......... H04N 5/23238 348/241 |
| 2013/0242040 A1* | 9/2013 | Masuda ............... H04N 5/2251 348/36 |
| 2014/0078247 A1* | 3/2014 | Shohara ................ H04N 9/735 348/38 |
| 2014/0176542 A1 | 6/2014 | Shohara et al. |

FOREIGN PATENT DOCUMENTS

| | | | | |
|---|---|---|---|---|
| JP | 2002-281379 | | 9/2002 | |
| JP | 2003-244511 | | 8/2003 | |
| JP | 2003244551 | * | 8/2003 | ............. H04N 5/335 |
| JP | 2007-53617 | | 3/2007 | |
| JP | 2007053617 | * | 3/2007 | ............. H04N 5/235 |
| JP | 2007-329555 | | 12/2007 | |
| JP | 2014-78926 | | 5/2014 | |
| JP | 2014-123797 | | 7/2014 | |
| JP | 2014-127001 | | 7/2014 | |

OTHER PUBLICATIONS

International Search Report issued on Oct. 8, 2013 in PCT/JP2013/074170 filed on Sep. 3, 2013.
Office Action dated Apr. 24, 2017 in Chinese Patent Application No. 201380047263.1 (with English translation).

* cited by examiner

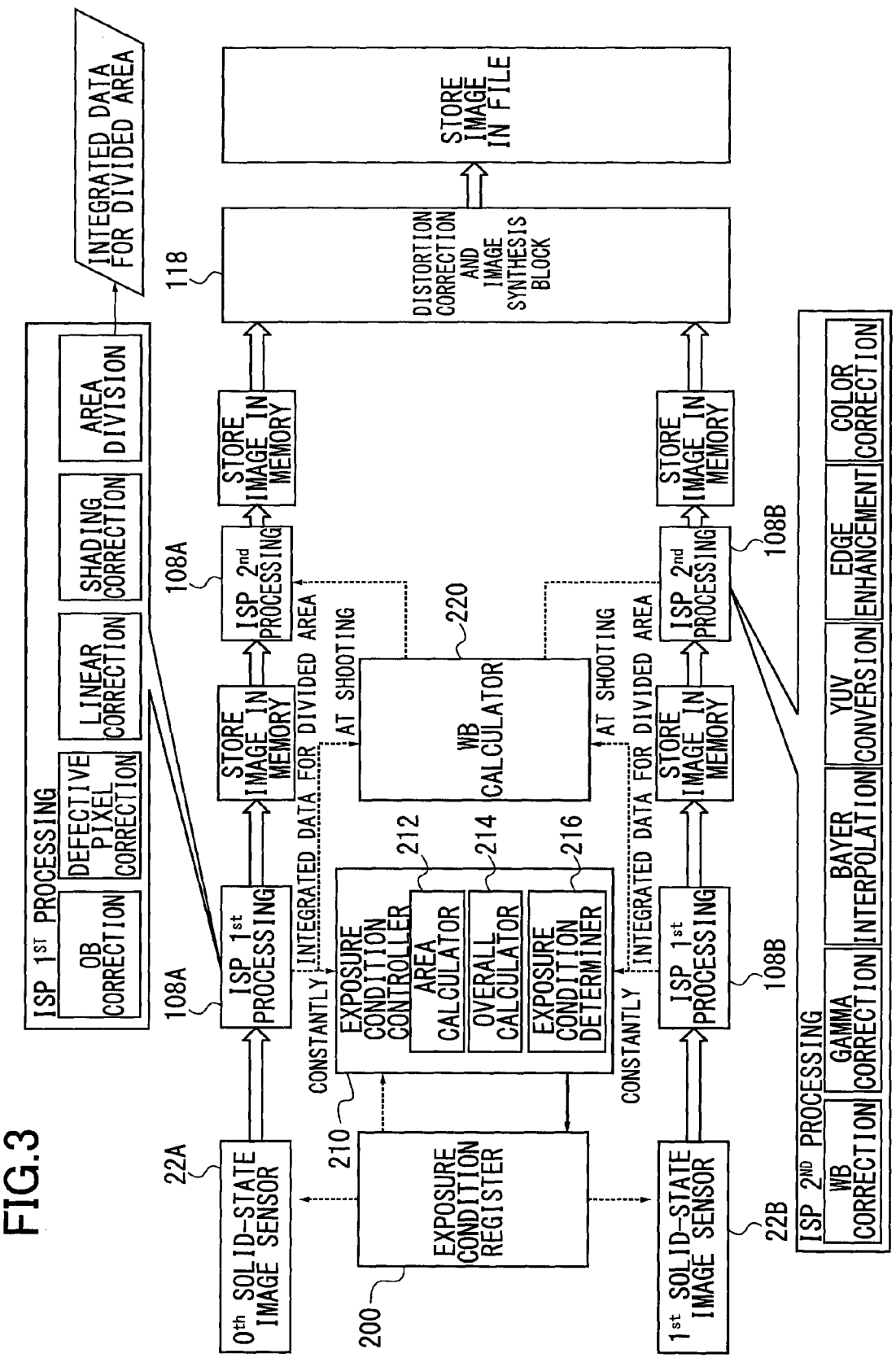

IMAGING CONTROLLER AND IMAGING CONTROL METHOD AND PROGRAM

CROSS REFERENCE TO RELATED APPLICATION

The present application is based on and claims priority from Japanese Patent Application No. 2012-199622, filed on Sep. 11, 2012.

TECHNICAL FIELD

The present invention relates to an imaging controller which can provide appropriate imaging conditions to multiple imaging units, and an imaging control method executed by the imaging controller and a program for realizing the imaging control method.

BACKGROUND ART

There is a known omnidirectional imaging system which includes multiple wide-angle lenses such as fisheye lens or super wide-angle lens to capture an image in omnidirections at once. It is configured to project images from the lenses onto a sensor surface and combine the images through image processing to thereby generate an omnidirectional image. For example, by use of two wide-angle lenses with angle of view of over 180 degrees, omnidirectional images can be generated. In the image processing a partial image captured by each lens system is subjected to distortion correction and projection conversion on the basis of a certain projection model with a distortion from an ideal model taken into account. Then, the partial images are connected on the basis of an overlapping portion of the partial images to form a single omnidirectional image.

In related art an exposure correction technique of a digital camera to acquire a proper exposure from a captured image is known. For instance, Japanese Patent Application Publication No. 2007-329555 discloses an imaging system including multiple imaging units arranged to have an overlapping imaging area to extract an overlapping area from each of the images captured by the imaging units. It is configured to adjust at least one of the exposure and white balance of the imaging units according to each image of the extracted overlapping areas to reduce a difference in the brightness or color of the captured images, for the purpose of abating workloads of post-processing such as synthesis.

However, it is difficult for the omnidirectional imaging system to acquire a proper exposure by such a related-art exposure correction technique because the optical conditions or photographic circumstances of the imaging units thereof differ. The related art disclosed in the above document only concerns an overlapping area so that it cannot obtain appropriate exposure correction values under an unbalanced exposure condition if the overlapping area is small relative to the entire image. In particular, since the imaging area of the omnidirectional imaging system is omnidirectional, a high-brightness subject as the sun is often captured on a sensor, which may cause a flare and an increase in image offset value. A proper exposure can be obtained for each sensor, however, it may cause a difference in brightness between the connecting portions of the images and impair the quality of an omnidirectional image.

DISCLOSURE OF THE INVENTION

The present invention aims to provide an imaging controller and imaging control method and program which can provide to each of imaging units a proper imaging condition to abate a discontinuity at the connecting points of the images captured by the imaging units in synthesizing the images.

According to one aspect of the present invention, an imaging controller comprises an index calculator to calculate an index value for each of divided areas of images captured by a plurality of imaging units, the index value for evaluating a photographic state of each of the divided areas, an evaluation value calculator to evaluate the images and an overlapping area between the images on the basis of the index value of each divided area calculated by the index calculator and calculate an overall evaluation value, and a condition determiner to determine an imaging condition for each of the imaging units on the basis of the overall evaluation value calculated by the evaluation value calculator.

BRIEF DESCRIPTION OF THE DRAWINGS

Features, embodiments, and advantages of the present invention will become apparent from the following detailed description with reference to the accompanying drawings:

FIG. 3 shows a flow of the entire image processing of the omnidirectional imaging system in FIG. 1;

DESCRIPTION OF EMBODIMENTS

Hereinafter, an embodiment of an imaging controller and an imaging system will be described in detail with reference to the accompanying drawings. Wherever possible, the same reference numbers will be used throughout the drawings to refer to the same or like parts. By way of example, the present embodiment describes an omnidirectional imaging system which comprises a camera unit including two fisheye lenses and a function to decide an imaging condition on the basis of images captured by the two fisheye lenses. However, the present embodiment should not be limited to such an example. Alternatively, the omnidirectional imaging system can comprise a camera unit including three or more fisheye lenses to determine an imaging condition according to the images captured by the fisheye lenses. Herein, a fisheye lens can include a wide-angle lens or a super wide-angle lens.

Figure 1:
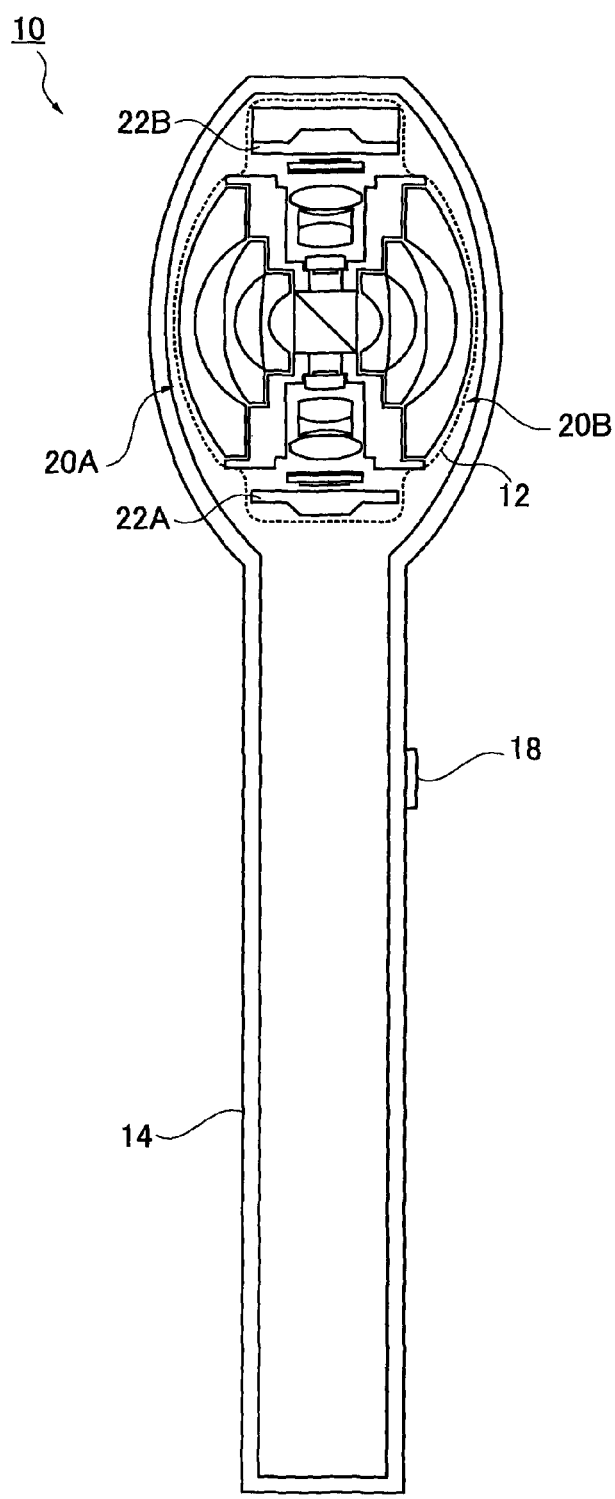
FIG. 1 is a cross section view of an omnidirectional imaging system according to the present embodiment.
Figure 2:
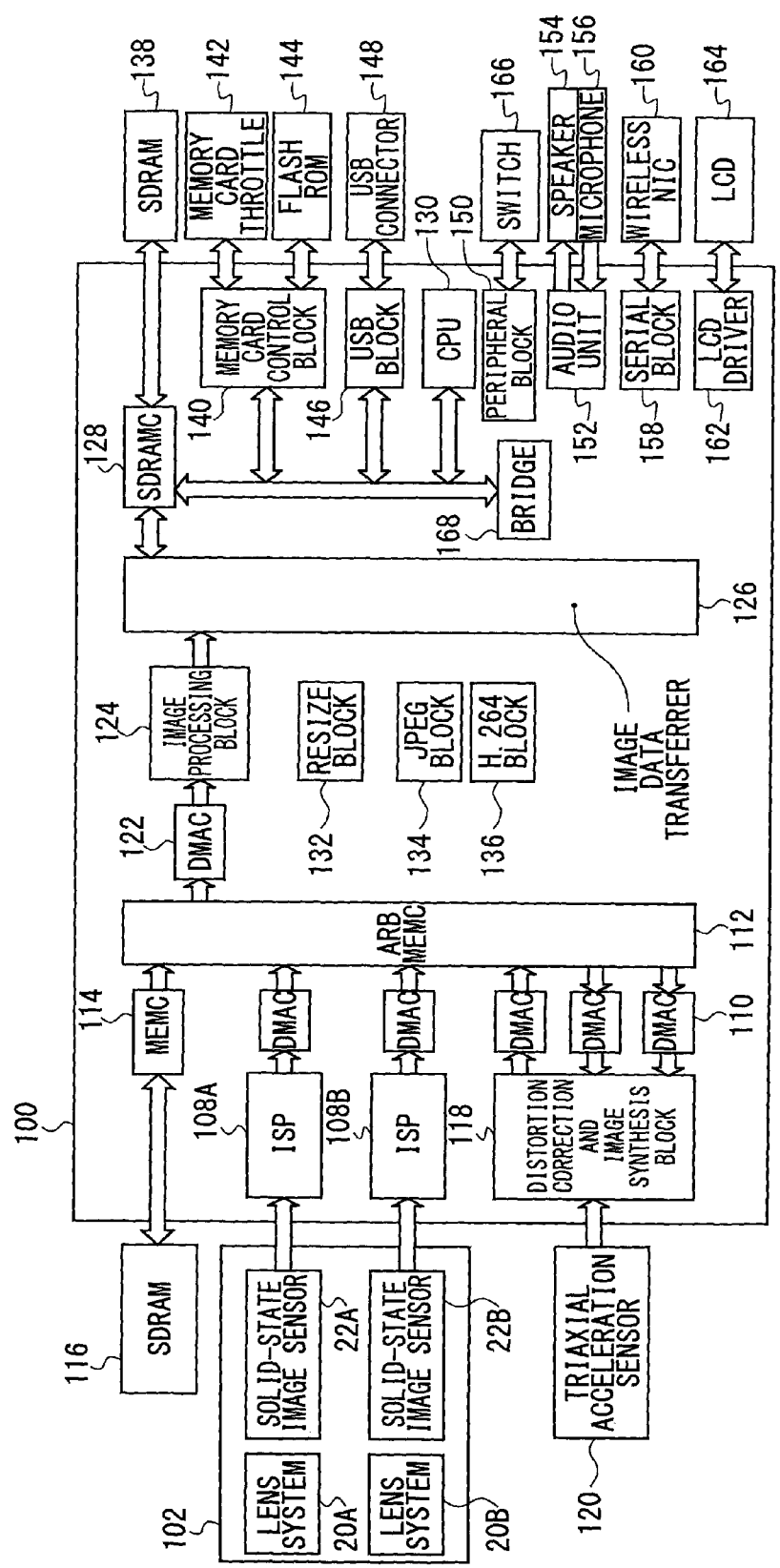
FIG. 2 shows the hardware configuration of the omnidirectional imaging system in FIG. 1.

Referring to FIGS. 1 to 2, the overall configuration of an omnidirectional imaging system 10 is described. FIG. 1 is a cross section view of the omnidirectional imaging system 10 (hereinafter, simply imaging system). It comprises a camera unit 12, a housing 14 accommodating the camera unit 12 and elements as controller, batteries, and a shutter button 18 provided on the housing 14.

The camera unit 12 in FIG. 1 comprises two lens systems 20A, 20B and two solid-state image sensors 22A, 22B as CCD (charge coupled device) sensor or CMOS (complementary metal oxide semiconductor). Herein, each of the pairs of the lens systems 20 and solid-state image sensors 22 are referred to as imaging unit. The lens systems 20A, 20B are each comprised of 6 groups of 7 lenses as a fisheye lens, for instance. In the present embodiment the fisheye lens has total angle of view of 180 degrees (360 degrees/n, n=2) or more, preferably 185 degrees or more, more preferably 190 degrees or more.

The optical elements as lenses, prisms, filters, aperture stops of the lens systems 20A, 20B are positioned relative to the solid-state image sensors 22A, 22B so that the optical axes of the optical elements are orthogonal to the centers of the light receiving areas of the corresponding solid-state image sensors 22 as well as the light receiving areas become the imaging planes of the corresponding fisheye lenses. The solid-state image sensors 22 are area image sensors on which photodiodes are two-dimensionally arranged, to convert light gathered by the lens systems 20 to image signals.

In the present embodiment the lens systems 20A, 20B are the same and disposed opposite to each other so that their optical axes coincide. The solid-state image sensors 22A, 22B convert light distribution to image signals and output them to a not-shown image processor on the controller. The image processor combines partial images from the solid-state image sensors 22A, 22B to generate a synthetic image with solid angle of 4π in radian or an omnidirectional image. The omnidirectional image is captured in all the directions which can be seen from a shooting point. Instead of the omnidirectional image, a panorama image which is captured in a 360-degree range only on a horizontal plane can be generated.

To form an omnidirectional image with use of the fisheye lenses with total angle of view of more than 180 degrees, an overlapping portion of the captured images by the imaging units is used for connecting images as reference data representing the same image. Generated omnidirectional images are output to, for instance, a display provided in or connected to the camera unit 12, a printer or an external storage medium such as SD Card®, compact Flash®.

FIG. 2 shows the structure of hardware of the imaging system 10 according to the present embodiment. The imaging system 10 comprises a digital still camera processor 100 (hereinafter, simply processor), a lens barrel unit 102, and various elements connected with the processor 100. The lens barrel unit 102 includes the two pairs of lens systems 20A, 20B and solid-state image sensors 22A, 22B. The solid-state image sensors 22A, 22B are controlled by a command from a CPU 130 of the processor 100.

The processor 100 comprises ISPs (image signal processors) 108A, 108B, a DMAC (direct memory access controller) 110, an arbiter (ARBMEMC) 112 for memory access, a MEMC (memory controller) 114 for memory access, and a distortion correction and image synthesis block 118. The ISPs 108A, 108B perform automatic exposure control to and set white balance and gamma balance of image data signal-processed by the solid-state image sensors 22A, 22B.

The MEMC 114 is connected to an SDRAM 116 which temporarily stores data used in the processing of the ISP 108A, 108B and distortion correction and image synthesis block 118. The distortion correction and image synthesis block 118 performs distortion correction and vertical inclination correction on the two partial images from the two imaging units on the basis of information from a triaxial acceleration sensor 120 and synthesizes them.

The processor 100 further comprises a DMAC 122, an image processing block 124, a CPU 130, an image data transferrer 126, an SDRAMC 128, a memory card control block 140, a USB block 146, a peripheral block 150, an audio unit 152, a serial block 158, an LCD (Liquid Crystal Display) driver 162, and a bridge 168.

The CPU 130 controls the operations of the elements of the imaging system 10. The image processing block 124 performs various kinds of image processing on image data together with a resize block 132, a JPEG block 134, and an H. 264 block 136. The resize block 132 enlarges or shrinks the size of image data by interpolation. The JPEG block 134 is a codec block to compress and decompress image data in JPEG. The H. 264 block 136 is a codec block to compress and decompress video data in H.264. The image data transferrer 126 transfers the images processed by the image processing block, 124. The SDRAMC 128 controls the SDRAM 138 connected to the processor 100 and temporarily storing image data during image processing by the processor 100.

The memory card control block 140 controls data read and write to a memory card and a flash ROM 144 inserted to a memory card throttle 142 in which a memory card is detachably inserted. The USB block 146 controls USB communication with an external device such as personal computer connected via a USB connector 148. The peripheral block 150 is connected to a power switch 166.

The audio unit 152 is connected to a microphone 156 for receiving an audio signal from a user and a speaker 154 for outputting the audio signal, to control audio input and output. The serial block 158 controls serial communication with the external device and is connected to a wireless NIC (network interface card) 160. The LCD driver 162 is a drive circuit for the LCD 164 and converts the image data to signals for displaying various kinds of information on an LCD 164.

The flash ROM 144 contains a control program written in readable codes by the CPU 130 and various kinds of parameters. Upon power-on of the power switch 166, the control program is loaded onto a main memory. The CPU 130 controls the operations of the units and elements of the image processor in compliance with the control program on the main memory, and temporarily stores necessary control data in the SDRAM 138 and a not-shown local SRAM.

FIG. 3 shows essential function blocks for controlling imaging condition and the flow of the entire image processing of the imaging system 10 according to the present embodiment. First, the solid-state image sensors 22A, 22B capture images under a certain exposure condition and output them. Then, the ISPs 108A, 108B in FIG. 2 perform optical black correction, defective pixel correction, linear correction, shading correction and area division (collectively referred to as first processing) to the images from the solid-state image sensors 22A, 22B and store them in memory.

The optical black correction is a processing in which an output signal from an effective pixel area is subjected to clamp correction, using the output signals of optical black areas of the solid-state image sensors as a black reference level. A solid-state image sensor such as CMOS may contain defective pixels from which pixels values are not obtainable because of impurities entering a semiconductor substrate in the manufacturing of the image sensor. The defective pixel correction is a processing in which the value of a defective pixel is corrected according to a combined signal from neighboring pixels of the defective pixel.

The linear correction is for each of RGBs. The shading correction is to correct a distortion of shading in an effective pixel area by multiplying the output signal of the effective pixel area by a certain correction coefficient. The area division is to divide a captured image into small areas and calculate an integrated value or an integrated average value of brightness values for each divided area.

Returning to FIG. 3, after the first processing the ISPs 108A, 108B further perform white balance, gamma correction, Bayer interpolation, YUV conversion, edge enhancement and color correction (collectively referred to as second processing) to the images, and the images are stored in the memory. The amount of light transmitting through the color filters of the image sensors changes depending on the color of the filter. The white balance correction is to correct a difference in sensitivity to the three colors R (red), G (green), and B (blue) and set a gain for appropriately representing white color in an image. A WB (white balance) calculator 220 calculates a white balance parameter according to the RGB integrated value or integrated average value calculated in the area division process. The gamma correction is to correct a gamma value of an input signal so that the output linearity of an output device is maintained with the characteristic thereof taken into account.

Further, in the CMOS each pixel is attached with any of RGB color filters. The Bayer interpolation is to interpolate insufficient two colors from neighboring pixels. The YUV conversion is to convert RAW data in RGB format to data in YUV format of a brightness signal Y and a color difference signal UV. The edge enhancement is to extract the edges of an image according to a brightness signal, apply a gain to the edges, and remove noise in the image in parallel to the edge extraction. The color correction includes chroma setting, hue setting, partial hue change, and color suppression.

After the various kinds of processing to the captured images under a certain exposure parameter, the images are subjected to distortion correction and image synthesis. A generated omnidirectional image is added with a tag properly and stored in a file in the internal memory or an external storage. Inclination correction can be additionally performed on the basis of the information from the triaxial acceleration sensor 120 or a stored image file can be subjected to compression when appropriate. A thumb-nail image can be generated by cropping or cutting out the center area of an image.

In the above-described image processing the exposure parameter for the solid-state image sensors 22A, 22B is determined and set in an exposure condition register 200 by an exposure condition controller 210. The imaging system 10 according to the present embodiment does not need to include a photometer for measuring the brightness of a subject but uses the outputs of the solid-state image sensors 22A, 22B for exposure control. To display a captured image on a LCD or an EVF (electronic view finder), image signals are constantly read from the solid-state image sensors 22A, 22B. The exposure condition controller 210 repeatedly conducts a photometry on the basis of a read image signal and determines whether a brightness level is appropriate, to correct the exposure parameter such as F-value, exposure time (shutter speed), amplifier gain (ISO sensitivity) and obtain a proper exposure.

Figure 4B:
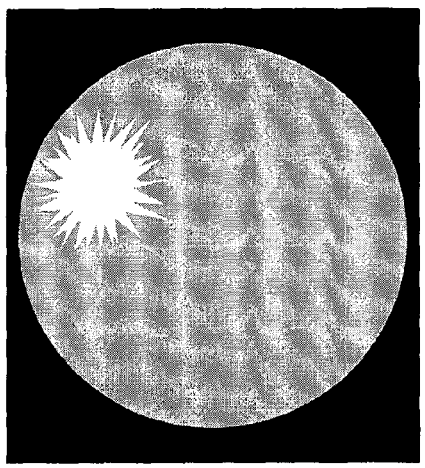
FIGS. 4A, 4B show $0^{th}$ and $1^{st}$ images captured by two fisheye lenses, respectively
Figure 4A:
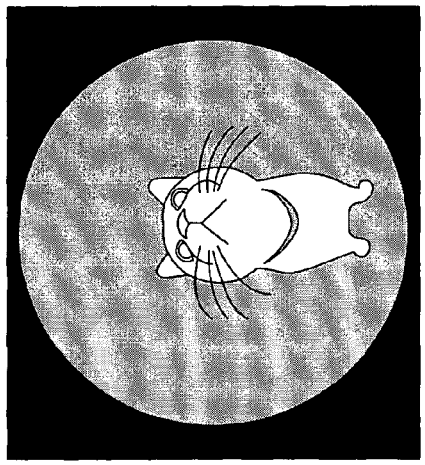
Figure 4C:
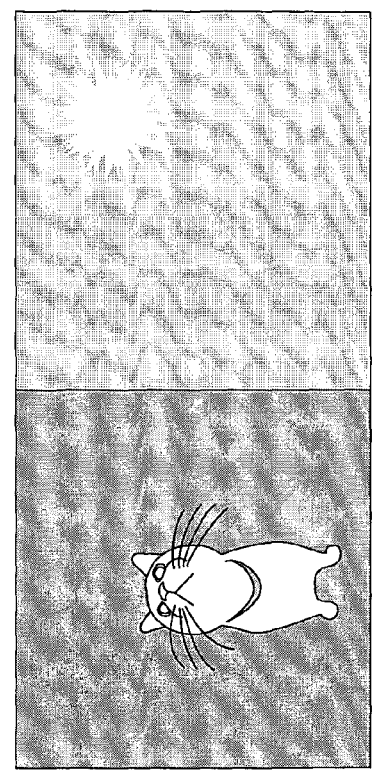
FIG. 4C shows a synthetic image of the $0^{th}$ and $1^{st}$ captured images by way of example.

In omnidirectional photographing with the omnidirectional imaging system 10, the two imaging units generate two images. In a photographic scene including a high-brightness object as the sun, a flare may occur in one of the images as shown in FIGS. 4A, 4B and spread over the entire image from the high-brightness object. In such a case a synthetic image of the two images or omnidirectional image may be impaired in quality because an increased offset of the one of the images causes a difference in brightness at the connecting portions. Further, no proper object for exposure correction but an extremely white or black object will appear in an overlapping area of the two images.

In the imaging unit using fisheye lenses with total angle of view of over 180 degrees, most of photographic areas do not overlap except for partial overlapping areas. Because of this, it is difficult to acquire a proper exposure for the above scene by exposure correction based only on the overlapping area. Further, even with the proper exposure obtained for the individual imaging units, a discontinuity of color attribute as brightness may occur at the connecting positions of a synthetic image.

In view of avoiding insufficient exposure control, in the imaging system 10 the exposure condition controller 210 is configured to evaluate the level of exposure of all of the images with the overlapping area and non-overlapping areas of the images taken into consideration and decide exposure parameters as aperture a, exposure time t and amplifier gain g for the solid-state image sensors 22A, 22B to be set in the exposure condition register 200.

Specifically, the exposure condition controller 210 includes an area calculator 212, an overall calculator 214 and an exposure condition determiner 216, and can be realized by the ISPs 108 and CPU 130. In the first processing the ISPs 108A, 108B calculate the integrated value or integrated average value for each divided area and outputs integrated data for each divided area, and the exposure condition controller 210 reads the integrated data.

Figure 5A:
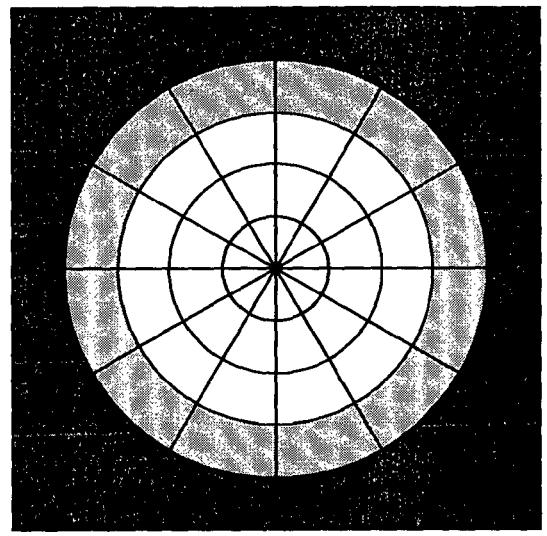
FIG. 5A, 5B show an area division method according to the present embodiment.
Figure 5B:
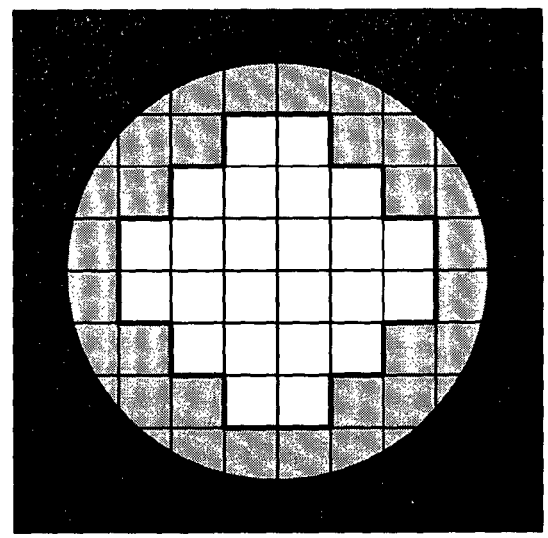

FIGS. 5A, 5B show how to divide an image into small areas by way of example. In the present embodiment incident light on the lens systems 20A, 20B is imaged on the light-receiving areas of the solid-state image sensors 22A, 22B in accordance with a certain projection model such as equidistant projection. Images are captured on the two-dimensional solid-state area image sensors and image data represented in a plane coordinate system. In the present embodiment a circular fisheye lens having an image circle diameter smaller than an image diagonal line is used and an obtained image is a planar image including the entire image circle in which the photographic areas in FIGS. 4A, 4B are projected.

The entire image captured by each solid-state image sensor is divided into small areas in circular polar coordinate system with radius r and argument $\theta$ in FIG. 5A or small areas in planar orthogonal coordinate system with x and y coordinates in FIG. 5B. It is preferable to exclude the outside of the image circle from a subject of integration and averaging since it is a non-exposed outside area. In the area division of the ISPs 108, each image is divided into small areas as shown in FIGS. 5A, 5B and the integrated value or integrated average value of brightness is calculated for each divided area. The integrated value is obtained by integrating the brightness values of all the pixels in each divided area while the integrated average value is obtained by normalizing the integrated value with the size (number of pixels) of each divided area excluding the outside area.

The area calculator 212 receives the integrated data for each divided area including the integrated average value and calculates an index value for each divided area to evaluate a photographic state thereof. In the present embodiment the index value is an area brightness level b for evaluating an absolute brightness of each divided area. The brightness level $b(x, y)$ of a certain divided area is calculated for each solid-state image sensor 22 by the following equation:

$$b(x, y) = s(x, y) \frac{a^2}{t \cdot g} \quad (1)$$

where s(x,y) is an integrated average value for a certain divided area, a is an aperture, t is exposure time, and g is amplifier gain. The brightness level b(r, θ) of a divided area in a circular coordinate system can be calculated in the same manner.

The brightness level b (x, y) is an index value to evaluate the brightness of a subject in each divided area and calculated from the brightness of a pixel value of an actual image according to a current exposure parameter (a, t, g).

The overall calculator 214 evaluates the captured images including the overlapping area as a whole on the basis of the calculated brightness level b'(x, y) and calculates an overall evaluation value with weighting according to an overlapping portion between the photographic areas of the images. Herein, the solid-state image sensors 22A, 22B are referred to as $0^{th}$ and $1^{st}$ image sensors and their brightness levels are referred to as $b^0$ (x,y) and $b^1$(x,y), respectively. In the present embodiment the overall evaluation value is an overall brightness level bT to evaluate the brightness of all the areas of the images or subject brightness as a whole with a certain weighting.

The overall brightness level $bT^i$ is calculated for an i-th solid-state image sensor by the following equation:

$$bT^i = \frac{\sum_{x,y} b^0(x, y) \times w^{0i}(x, y) + \sum_{x,y} b^1(x, y) \times w^{1i}(x, y)}{\sum_{x,y} w^{0i}(x, y) + \sum_{x,y} w^{1i}(x, y)} \quad (2)$$

where $b^j$ (x,y) is a brightness level for each divided area of each solid-state image sensor j (j∈0, 1) and $w^{ji}$ (x, y) is a weighted value in weighted averaging for each divided area.

As expressed by the above equation, different sets of weighted values $w^{ji}$ (x, y) are used for each solid-state image sensor. The weighted values $w^{ji}$ (x, y) can be adjusted so that a larger value is given to a solid-state image sensor with a lower brightness level to prevent receipt of an influence from a light source. Thus, weighting can be performed properly in accordance with a result of determination about a photographic scene. Further, the small areas (x, y) can be zoned into intermediate areas as overlapping area and non-overlapping area as indicated by hatching in FIGS. 5A, 5B. The overall brightness level $bT^i$ can be calculated by the following equation, using the brightness level and weighted values for each intermediate area.

$$bT^i = \frac{w1i \times bE^0 + w2i \times bE^1 + w3i \times bC^0 + w4i \times bC^1}{w1i + w2i + w3i + w4i} \quad (3)$$

where $bE^0$ is a brightness level (average) of an edge area (overlapping area) of the $0^{th}$ image, $bC^0$ is a brightness level (average) of a center area (non-overlapping area) of the $0^{th}$ image, $bE^1$ is a brightness level (average) of an edge area (overlapping area) of the $1^{st}$ image, $bC^1$ is a brightness level (average) of a center area (non-overlapping area) of the $1^{st}$ image, and w1i to w4i are weighted values of weighted averaging set for each intermediate area of an i-th solid-state image sensor. The basic values of weighted values w1i to w4i can be calculated by the following equations (4):

$W1i = W2i = Ae/(A0+A1+2Ae)$ $W3i = A0/(A0+A1+2Ae)$ $W4i = A1/(A0+A1+2Ae)$ where Ae is the size of the edge areas of the $0^{th}$ and $1^{st}$ images, and A0 and A1 are the sizes of the center areas of the $0^{th}$ and $1^{st}$ images. The calculated basis values can be corrected in accordance with a result of determination about a photographic scene such that a solid-state image sensor with a lower brightness level is given a larger weight.

Preferably, the overall calculator 214 can include a weighting setter to set the weighted values $w^{ji}$(x, y) according to a signal level of a captured image. The weighting setter is configured to create a brightness distribution (histogram) from the brightness levels $b^j$(x, y) of all the divided areas and analyze a total average value and brightness distribution for the scene determination. Then, according to a determined scene, it can change the weighted values $w^{ji}$(x, y) for a certain divided area depending on the brightness level $b^j$(x, y) for the divided area in question.

For example, in a dark scene as night view, the weighting setter sets, by adding a predetermined amount to the area brightness level, the weighted value $w^{ji}$(x, y) to a larger value for evaluating a divided area with a larger brightness level b(x, y) calculated. Thereby, a bright subject in a dark scene is highly evaluated for photometry and exposure can be properly controlled according to a result of the photometry. Meanwhile, in a bright scene the weighting setter sets a larger weighted value $w^{ji}$(x, y) for a divided area with a smaller brightness level b(x, y) calculated. Thus, a dark subject in a bright scene is highly evaluated for photometry.

Alternatively, a divided area containing an extremely black or white subject can be detected according to an upper limit threshold and a lower limit threshold to exclude the divided area for a subject of the photometry. For example, if a divided area or a white area with a brightness level equal to or over an upper limit threshold ($b_{uth}$) and/or a divided area or a black area with a brightness level equal to or below a lower limit threshold ($b_{lth}$) is/are detected, these areas can be given a smaller weight or zero. Thereby, it is possible to calculate the overall brightness level bT with the divided area unsuitable for exposure correction given a small weight or not taken into account.

The weighting setter determines a scene of each the $0^{th}$ and $1^{st}$ images captured by the two solid-state image sensors 22A, 22B on the basis of a relation of the brightness between the two images and sets weighted values appropriate for the scene for each of the solid-state image sensors 22A, 22B. For example, to prevent receipt of an influence from a light source, the weighted values $w^{ji}$ (x, y) can be adjusted so that a larger value is given to a solid-state image sensor with a lower brightness level.

The exposure condition determiner 216 determines an exposure parameter (a, t, g) for each i-th solid-state image sensor on the basis of the overall brightness level $bT^i$ calculated by the overall calculator 214. The overall brightness level bT is to evaluate the brightness of a subject in the images, and a condition for acquiring a proper exposure can be represented by the following conditions:

$$\frac{a^2}{t} = \frac{bT \cdot g}{K} \quad (4)$$

$$Bv + Sv = Av + Tv \quad (5)$$

where k is a constant, Bv is a brightness value, Sv is a sensitivity value, Av is an aperture value and Tv is a time value. The condition (5) is a transformation of the condition (4) taking 2 as a base of logarithm of each of the four parameters.

The four parameters are calculated by the following equations:

$$Av = 2\log_2 a \qquad (6)$$

$$Tv = \log_2 \frac{1}{t} \qquad (7)$$

$$Bv = \log_2(k_1 bT) \qquad (8)$$

$$Sv = \log_2(k_2 g) \qquad (9)$$

In the equations (8), (9) $k_1$, $k_2$ are constants.

Specifically, to satisfy the above exposure conditions, the exposure condition determiner 216 adjusts the aperture a, exposure time t and amplifier gain g for each i-th solid-state image sensors 22 according to a current exposure parameter and a measured subject brightness or overall brightness level and acquires a proper exposure. The corrected exposure parameter (a', t', g') can be obtained from the brightness level $bT^i$, referring to a table called a program diagram which is prepared in advance in accordance with the characteristic of the imaging system 10. Herein, the program diagram refers to a diagram or a table containing the combinations of the amplifier gain g and exposure time t with a fixed aperture a. Exposure values can be determined from the combinations.

In the present embodiment an optimal combination of the aperture a, exposure time t and amplifier gain g is obtainable from the overall brightness level bT by a certain program diagram. Alternatively, at least one of the aperture a, exposure time t and amplifier gain g can be manually set and the rest of them can be found from the program diagram. Such automatic exposure mode exemplifies shutter priority mode in which exposure time t is manually set, aperture priority mode in which aperture a is manually set, and sensitivity priority mode in which amplifier gain g is manually set.

Figure 6:
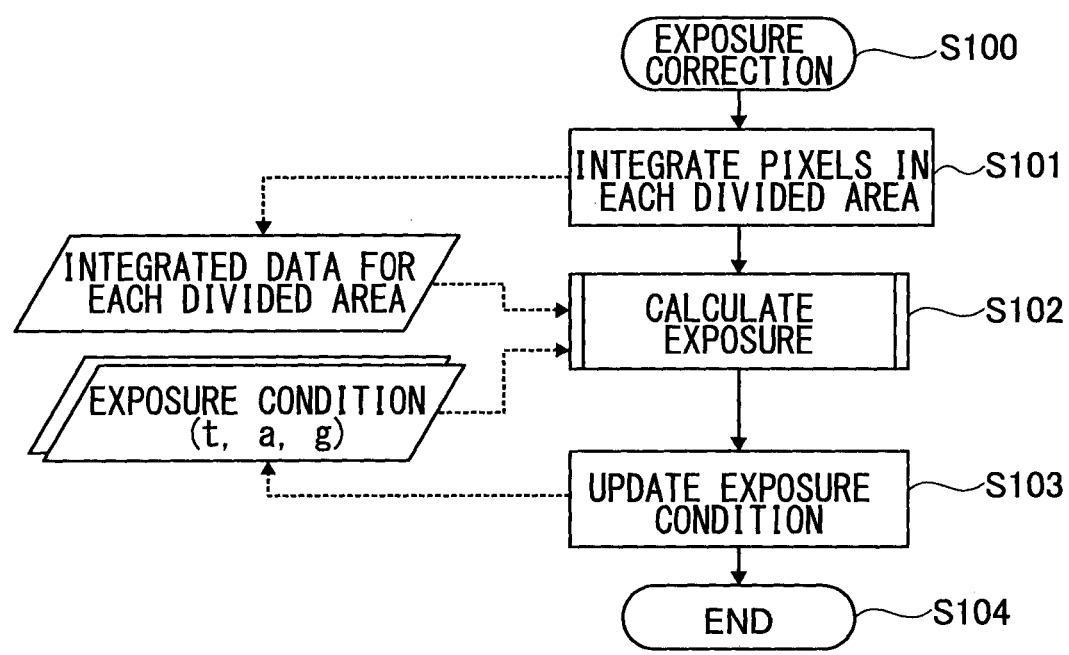
FIG. 6 is a flowchart for exposure control executed by the omnidirectional imaging system according to the present embodiment.
Figure 7:
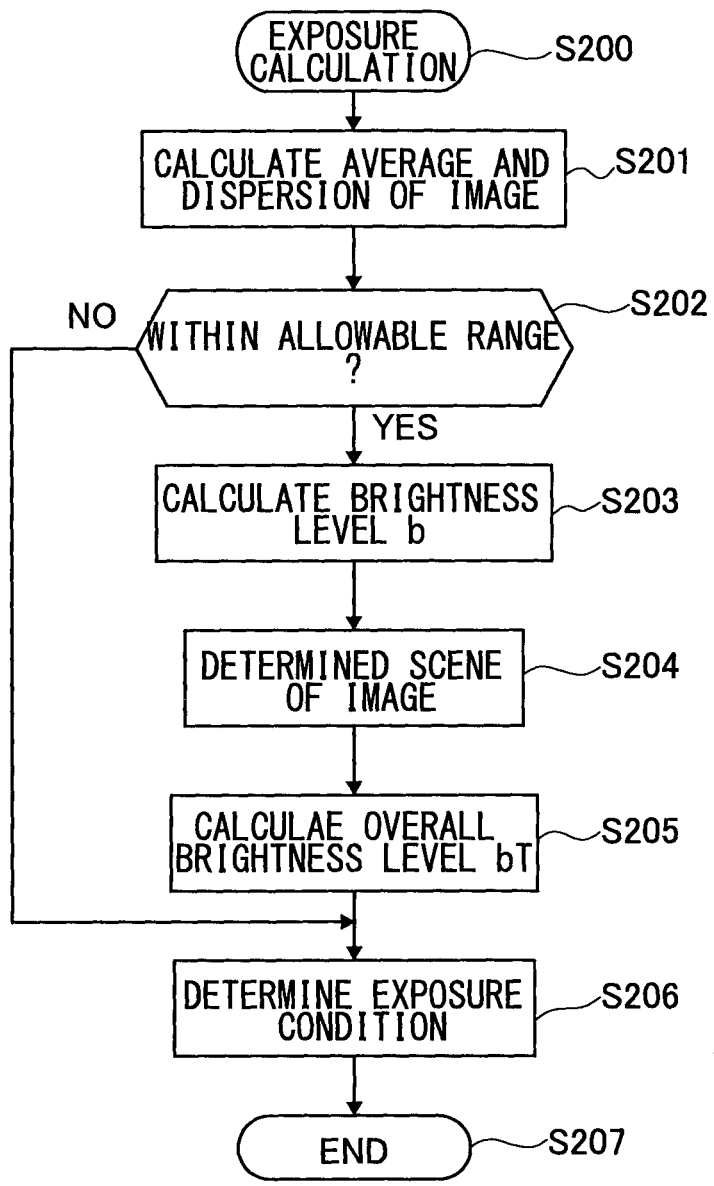
FIG. 7 is a flowchart for exposure calculation executed by the omnidirectional imaging system according to the present embodiment.

Hereinafter, the exposure control by the imaging system 10 is described, referring to FIGS. 6, 7. FIG. 6 is a flowchart for the exposure control while FIG. 7 is a flowchart for exposure calculation process of the exposure control. The operation in FIG. 6 is repeatedly executed every time images are captured by the image sensors 22A, 22B. In step S101 the imaging system 10 calculates an integrated average value for each divided area of the two image sensors 22A, 22B by integrating the pixel values thereof. In step S102 the exposure calculation in FIG. 7 is called up.

In FIG. 7 in step S201 the imaging system 10 takes the statistics of integrated average values for the divided areas of each solid-state image sensor 22 to calculate an average and a dispersion (or a standard deviation) of the image. In step S202 the imaging system 10 determines whether a current exposure parameter is in an allowable range from the average and dispersion of the two images to sufficiently evaluate a subject brightness. For example, if the average of the images is close to zero and the dispersion is lower than a certain threshold, it is probable that black saturation occur in the captured images. In contrast, if the average is close to saturation and a dispersion is low, it is probable that white saturation occur in the captured images. The light amount of captured images with black or white saturation cannot be properly measured so that the exposure parameter indicating black or white saturation is determined to be outside the allowable range.

With NO in step S202, the imaging system 10 proceeds to step S206 and adjusts an exposure parameter to acquire a proper exposure, and completes the operation in step S207. For instance, with the occurrence of black saturation, the exposure parameter is adjusted so that the aperture is opened and exposure time and sensitivity are increased. In contrast, with the occurrence of white saturation, the exposure parameter is adjusted so that the aperture is closed and exposure time and sensitivity are decreased. When the gain g is fixed, the exposure parameter (a', t') is adjusted by lowering an exposure value Ev by a predetermined number of steps in black saturation. In white saturation the exposure parameter (a', t') is adjusted by raising an exposure value Ev by a predetermined number of steps. When the aperture a is fixed, the exposure parameter (t', g') is adjusted by increasing the exposure time t and amplifier gain g in black saturation and decreasing them in white saturation.

With YES in step S202, the area calculator 212 calculates a brightness level $b^i(x,y)$ for each divided area of the $0^{th}$ and $1^{st}$ images on the basis of the integrated average value s(x, y) and a current exposure parameter (a, t, g).

In step S204 the overall calculator 214 determines a scene of the images and reads a weighted value $w^{ji}(x, y)$ for the determined scene. In step S205 the overall calculator 214 calculates the weighted average of the brightness levels $b^0(x, y)$ and $b^1(x, y)$ and calculates the overall brightness level $bT^i$ for each i-th solid-state image sensors by the equations (2) and (3). In step S206 the exposure condition determiner 216 adjusts the exposure according to the overall brightness level $bT^i$ to satisfy the conditions (4) and (5) and determines the exposure parameter (a', t', g'). Then, the imaging system 10 completes the exposure calculation and returns to step S103 in FIG. 6.

In step S103 the exposure parameter in the exposure condition register 200 is updated to the determined exposure parameter (a', t', g'), completing the exposure control operation. By repeating the operations in FIGS. 6, 7, the exposure condition is set to a proper exposure satisfying the above conditions (4), (5).

In omnidirectional photographing with the omnidirectional imaging system 10, the same subject is captured in the overlapping area, therefore, the brightness levels b of the two images should be the same value. In view of the occurrence of flares in one of the images as shown in FIGS. 4A, 4B, according to the present embodiment the overall exposure level of the captured images including the overlapping area and non-overlapping areas is evaluated to determine the exposure parameter (a, t, g) for each of the imaging units. Thereby, it is made possible to abate a discontinuity of the brightness at the connecting positions of a synthetic image and generate high-quality synthetic images.

Thus, according to the above embodiment, it is possible to provide an imaging controller and imaging control method and program which can provide to each of imaging units a proper imaging condition to abate a discontinuity at the connecting points of the images captured by the imaging units in synthesizing the images.

The above embodiment has described an example where two images captured with the lens systems having angle of view of over 180 degrees are overlapped for synthesis. Alternatively, three or more images captured with multiple imaging units can be overlapped for synthesis.

Moreover, the above embodiment has described the imaging system 10 to capture an omnidirectional still image as an example of the imaging controller. The present invention should not be limited to such an example. Alternatively, the imaging controller can be configured as an omnidirectional video imaging system or unit, a portable data terminal such as a smart phone or tablet having an omnidirectional still or video shooting function, or a digital still camera processor or a controller to control a camera unit of an imaging system.

The functions of the omnidirectional imaging system can be realized by a computer-executable program written in legacy programming language such as assembler, C, C++, C#, JAVA® or object-oriented programming language. Such a program can be stored in a storage medium such as ROM, EEPROM, EPROM, flash memory, flexible disc, CD-ROM, CD-RW, DVD-ROM, DVD-RAM, DVD-RW, blue ray disc, SD card, or MO and distributed through an electric communication line. Further, a part or all of the above functions can be implemented on, for example, a programmable device (PD) as field programmable gate array (FPGA) or implemented as application specific integrated circuit (ASIC). To realize the functions on the PD, circuit configuration data as bit stream data and data written in HDL (hardware description language), VHDL (very high speed integrated circuits hardware description language), and Verilog-HDL stored in a storage medium can be distributed.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging controller comprising:
   an index calculator to calculate an index value, which is a brightness level to evaluate a brightness, for each of divided areas of images captured by a plurality of imaging units, the index value for evaluating a photographic state of each of the divided areas;
   an evaluation value calculator to evaluate the images and an overlapping area between the images on the basis of the index value of each divided area calculated by the index calculator and to calculate brightness level for each of the imaging units to evaluate a total brightness of the images by applying weighting to the overlapping area; and
   a condition determiner to determine an imaging condition including an exposure condition for each of the imaging units on the basis of the brightness level for each of the imaging units calculated by the evaluation value calculator.

2. The imaging controller according to claim 1, further comprising a setter to set, for each of the imaging units, a set of weighted values for the divided areas according to a relation of brightness between the images captured by the imaging units.

3. The imaging controller according to claim 1, further comprising a weighting setter to apply weighting to a certain divided area in accordance with the index value calculated for the certain divided area.

4. The imaging controller according to claim 3, wherein the weighting setter is configured to apply weighting to the divided areas such that in a dark scene a divided area for which a larger index value is calculated is given a larger weighting.

5. The imaging controller according to claim 3, wherein the weighting setter is configured to apply weighting to the divided areas such that in a bright scene a divided area for which a smaller index value is calculated is given a larger weighting.

6. The imaging controller according to claim 3, wherein the weighting setter is configured to apply weighting to the divided areas such that a divided area for which the index value as an upper limit threshold or more or a lower limit threshold or less is calculated is given a smaller weighting or zero.

7. The imaging controller according to claim 1, wherein the imaging condition includes at least one of an aperture, an exposure time and a gain.

8. An imaging control method comprising the steps of:
   calculating an index value, which is as brightness level to evaluate a brightness, for each of divided areas of images captured by a plurality of imaging units, the index value for evaluating a photographic state of each of the divided areas;
   evaluating the images and an overlapping area between the images on the basis of the index value of each divided area calculated in the calculating step;
   calculating a brightness level for each of the imaging units to evaluate a total brightness of the images by applying weighting to the overlapping area; and
   determining an imaging condition including an exposure condition for each of the imaging units on the basis of the brightness level for each of the imaging units calculated in the evaluating step.

9. A non-transitory computer-readable storage medium storing computer executable instructions which, when executed by a computer, cause the computer to:
   calculate an index value, which is as brightness level to evaluate a brightness, for each of divided areas of images captured by a plurality of imaging units, the index value for evaluating a photographic state of each of the divided areas;
   evaluate the images and an overlapping area between the images on the basis of the index value of each divided area;
   calculate a brightness level for each of the imaging units to evaluate a total brightness of the images by applying weighting to the overlapping area; and
   determine an imaging condition including an exposure condition for each of the imaging units on the basis of the brightness level for each of the imaging units.

* * * * *